United States Patent [19]
Beretta et al.

[11] Patent Number: 5,883,979
[45] Date of Patent: Mar. 16, 1999

[54] METHOD FOR SELECTING JPEG QUANTIZATION TABLES FOR LOW BANDWIDTH APPLICATIONS

[75] Inventors: Giordano Beretta, Palo Alto; Vasudev Bhaskaran, Mountain View; Konstantinos Konstantinides, San Jose; Balas K. Natarajan, Los Gatos, all of Calif.

[73] Assignee: Hewlett-Packard Company, Palo Alto, Calif.

[21] Appl. No.: 935,517

[22] Filed: Sep. 23, 1997

Related U.S. Application Data

[63] Continuation of Ser. No. 411,380, Mar. 27, 1995, abandoned.

[51] Int. Cl.$^6$ .................................................. H04N 1/415
[52] U.S. Cl. ......................... 382/251; 382/166; 358/433; 348/405
[58] Field of Search ..................................... 382/248, 250, 382/251, 252, 253, 176, 166; 358/432, 433; 348/405, 419

[56] References Cited

U.S. PATENT DOCUMENTS

| | | | |
|---|---|---|---|
| 5,063,608 | 11/1991 | Siegel | 382/56 |
| 5,101,438 | 3/1992 | Kanda et al. | 382/176 |
| 5,333,212 | 7/1994 | Ligtenberg | 382/56 |
| 5,341,441 | 8/1994 | Maeda et al. | 382/253 |
| 5,374,958 | 12/1994 | Yanagihara | 348/405 |
| 5,535,013 | 7/1996 | Murata | 358/432 |
| 5,559,900 | 9/1996 | Jayant et al. | 382/248 |

FOREIGN PATENT DOCUMENTS

| | | | |
|---|---|---|---|
| 0541302 A2 | 10/1992 | European Pat. Off. | H04N 7/13 |
| 0577350 A2 | 6/1993 | European Pat. Off. | H04N 7/13 |
| 0590922 | 9/1993 | European Pat. Off. | H04N 1/41 |
| 05145910 | 6/1993 | Japan | H04N 7/133 |
| 06350992 | 12/1994 | Japan | H04N 7/133 |

OTHER PUBLICATIONS

"Perceptual Optimization of DCT Color Quantization Matrices" Andrew B. Watson—Image Processing, 1994 International Conference, pp. 100–104.

Bhaskar Ramamurthi and Allen Gersho; Nonlinear Space–Variant Postprocessing of Block Coded Images:; IEEE Transactions on Acoustics, Speech, and Signal Processing, vol. ASSP–34, No. 5, Oct. 1986; pp. 1258–1268.

A. Rao, L. Lee, and S. Bhargava—Comstat Laboratories, 22300 Comsat Drive, Clarksburg, Maryland 20871–9475; "A Vector Quantization–Based Coding Scheme for Television Transmission Via Satellite"; Publication Date: Jun. 14, 1992; pp. 1605–1608.

(List continued on next page.)

*Primary Examiner*—Amelia Au
*Assistant Examiner*—Larry Prikockis

[57] ABSTRACT

A method of compressing color source image data includes forming a quantization table with a "supra-threshold" term. This method includes a step of selecting a set of target images, where each target image includes one or more image elements such as text. These image elements are then analyzed to identify those that are more important for visual quality. These "supra-threshold" terms are then selected that gives a larger weight to the quantization table elements that correspond to important image elements and a smaller weight to the table elements that correspond to less important image elements. This process selectively weights the characteristics of each DCT basis vectors. By giving larger weights to the table elements that correspond to the "up-downness" of the image, i.e., the vertical attributes of the image elements, and the "left-rightness" of the image, i.e., the horizontal attributes of the image elements, and smaller weights to the table elements corresponding to the "criss-crossedness" of the image, i.e., the diagonal attributes of the image elements, the visual quality of an image that includes text can be preserved while significantly increasing the compression ratio.

24 Claims, 10 Drawing Sheets

OTHER PUBLICATIONS

C. Avril, T. Nguyen–Trong—Laboratoire d/Astronomie Spatiale, P. O. Box 8, 13376 Marseille Cedex 12, France; "Linear Filtering for Reducing Blocking Effects in Orthogonal Transform Image Coding"; Journal of Electronic Imaging, Apr. 1992, vol. 1(2); pp. 183–191.

Victor–Emil I. Neagoe, Senior Member, IEEE; "Predictive Ordering Technique and Feedback Transform Coding for Data Compression of Still Pictures"; IEEE Transactions on Communications vol. 40, No. 2, Feb. 1992; pp. 385–396.

G. B. Beretta et al., "Experience with the New Color Facsimile Standard", ISCC Annual Meeting, Apr. 23–25, 1995, pp. 1–7.

Albert J. Ahumada, Jr. et al., "Luminance–Model–Based DCT Quantization for Color Image Compression", Human Vision, Visual Processing, and Digital Display III, 1666, 365–374, SPIE, 1992.

Kenneth R. Alexander et al., "Spatial–Frequency Characteristics of Letter Identification", J. Opt. Soc. Am. A, 11,9, 2375–2382, 1994.

Wen–Hsiung Chen et al., "Adaptive Coding of Monochrome and Color Images", IEEE Transactions on Comunications, COM–25, 1285–1292, 1977.

Bowonkoon Chitprasert et al., Human Visual Weighted Progressive Image Transmission, IEEE Transactions on Communications, COM–38, 7, 1040–1044, 1990.

R. J. Clarke, Spectral Responses of the Discrete Cosine and Walsh–Hadamard Transforms, IEE Proc., 130, Part F, 309–313, 1983.

K.K. De Valois et al., Color–Luminance Masking Interactions, Seeing Contour and Colour, J.J. Kulikowski, C.M. Dickinson and I.J. Murray Editors, Pergamon Press, Oxford, 1989.

J. Raymond Edinger, Jr., "A Measure for Stairstepping in Digitized Text that Correlates with the Subjective Impression of Quality", IS&T's Tenth International Congress on Advances in Non–Impact Printing Technologies, 552–558, 1994.

Yasushi Hoshino et al., Applicability of a Standardized Discrete Cosine Transform Coding Method to Character Images, J. Electronic Imaging, 1, 3, 322–327, 1992.

Chansik Hwang et al., Human Visual System Weighted Progressive Image Transmission Using Lapped Orthogonal Transform/Classified Vector Quantization, Optical Engineering, 32, 7, 1524–1530, 1993.

International Organization for Standardization: Information Technology—Digital Compression and Coding of Continuous–Tone Still Images—Part 1: Requirements and Guidelines, ISO/IEC IS 10918–1, Oct. 20, 1992.

International Telecommunication Union: Amendments to ITU–T Rec. T.30 for Enabling Continuous–Tone Colour and Gray–Scale Modes for Group 3, COM 8–43–E, Question 5/8, Mar. 1994.

International Telecommunication Union: Amendments to ITU–T Rec. T–4 to Enable Continuous–TIme Colour and Gray–Scale Modes for Group 3, COM 8–44–E, Question5/8, Mar. 1994.

Gordon E. Legge, "Reading: Effects of Contrast and Spatial Frequency", Applied Vision, OSA Technical Digest Series, 16, 90–93, 1989.

Gordon E. Legge et al., Contrast Masking in Human Vision, J. Opt. Soc. Am., 70,12,1458–1471, 1980.

David L. McLaren et al., "Removal of Subjective Redundancy from DCT–Coded Images", IEE Proceedings–I, 138, 5, 345–350, 1991.

I. Miyagawa et al., "Color–Facsimile System for Mixed–Color Documents", SID 94 Digest, 887–890, 1994.

Kathy T. Mullen, "The Contrast Sensitivity of Human Colour Vision to Red–Green and Blue–Yellow Chromatic Gratings", J. Physiol., 359, 381–400, 1985.

Daivd H. Parish et al., "Object Spatial Frequencies, Retinal Spatial Frequencies, Noise, and the Efficiency of Letter Discrimination", Vision Res., 31, 7/8, 1399–1415, 1991.

Denis G. Pelli et al., "Visual Factors in Letter Identification", IS&T's 47th Annual Conference/ICPS, p. 411, 1994.

Heidi A. Peterson et al., An Improved Detection Model for DCT Coefficient Quantization, Human Vision, Visual Processing, and Digital Display IV, 1913, 191–201, SPIE, 1993.

Ricardo L. de Queiroz et al., "Human Visual Sensitivity–Weighted Progressive Image Transmission Using the Lapped Orthogonal Transform", J. Electronic Imaging, 1, 3, 328–338, 1992.

Ricardo L. de Queiroz et al., Modulated Lapped Orthogonal Transforms in Image Coding, Digital Video Compression on Personal Computers: Algorithms and Technologies, 2187, 80–91, SPIE, 1993.

Robert J. Safranek et al., "A Perceptually Tuned Sub–Band Image Coder with Image Dependent Quantization and Post–Quantization Data Compression", Proc. ICASSP 89, 3, 1945–1948, 1989.

Andrew B. Watson, DCT Quantization Matrices Visually Optimized for Individual Images, Human Vision, Visual Processing, and Digital Display IV, 1913, 202–216, SPIE, 1993.

Andrew B. Watson et al., Discrete Cosine Transform (DCT) Basis Function Visibility: Effects of Viewing Distance and Contrast Masking, Human Vision, Visual Processing, and Digital Display V, 2179, 99–108, SPIE, 1994.

METHOD FOR SELECTING JPEG QUANTIZATION TABLES FOR LOW BANDWIDTH APPLICATIONS

CROSS REFERENCE TO RELATED APPLICATION(S)

This is a continuation of application Ser. No. 08/411,380 filed on Mar. 27, 1995, now abandoned.

RELATED APPLICATION DATA

This application incorporates subject matter disclosed in commonly-assigned application entitled TEXT AND IMAGE SHARPENING OF JPEG COMPRESSED IMAGES IN THE FREQUENCY DOMAIN, Ser. No. 08/411,369, filed on even date herewith.

BACKGROUND OF THE INVENTION

This invention relates to data compression using the JPEG compression standard for continuous-tone still images, both grayscale and color.

A committee known as "JPEG" which stands for "Joint Photographic Experts Group," has established a standard for compressing continuous-tone still images, both grayscale and color. This standard represents a compromise between reproducible image quality and compression rate. To achieve acceptable compression rates, which refers to the ratio of the uncompressed image to the compressed image, the JPEG standard adopted a lossy compression technique. The lossy compression technique was required given the inordinate amount of data needed to represent a color image, on the order of 10 megabytes for a 200 dots per inch (DPI) 8.5"×11" image. By carefully implementing the JPEG standard, however, the loss in the image can be confined to imperceptible areas of the image, which produces a perceptually lossless uncompressed image. The achievable compression rates using this technique are in the range of 10:1 to 50:1.

FIG. 1 shows a block diagram of a typical implementation of the JPEG compression standard. The block diagram will be referred to as a compression engine. The compression engine 10 operates on source image data, which represents a source image in a given color space such as CIELAB. The source image data has a certain resolution, which is determined by how the image was captured. Each individual datum of the source image data represents an image pixel. The pixel further has a resolution which is determined by the number of bits used to represent the image pixel.

The source image data is typically formatted as a raster stream of data. The compression technique, however, requires the data to be represented in blocks. These block represent a two-dimensional portion of the source image data. The JPEG standard uses 8×8 blocks of data. Therefore, a raster-to-block translation unit 12 translates the raster source image data into 8×8 blocks of source image data. The source image data is also shifted from unsigned integers to signed integers to put them into the proper format for the next stage in the compression process. These 8×8 blocks are then forwarded to a discrete cosine transformer 16 via bus 14.

The discrete cosine transformer 16 converts the source image data into transformed image data using the discrete cosine transform (DCT). The DCT, as is known in the art of image processing, decomposes the 8×8 block of source image data into 64 DCT elements or coefficients, each of which corresponds to a respective DCT basis vector. These basis vectors are unique 2-dimensional (2D) "spatial waveforms," which are the fundamental units in the DCT space. These basis vectors can be intuitively thought to represent unique images, wherein any source image can be decomposed into a weighted sum of these unique images. The discrete cosine transformer uses the forward discrete cosine (DCT) function as shown below, hence the name.

$$Y[k,l] = \frac{1}{4} C(k) \cdot C(l) \left[ \sum_{x=0}^{7} \sum_{y=0}^{7} S(x,y) \cdot \cos\frac{(2x+1)k\pi}{16} \cos\frac{(2y+1)l\pi}{16} \right]$$

where: $C(k), C(l) = 1/\sqrt{2}$ for $k, l=0$; and
$C(k), C(l) = 1$ otherwise

The output of the transformer 16 is an 8×8 block of DCT elements or coefficients, corresponding to the DCT basis vectors. This block of transformed image data is then forwarded to a quantizer 20 over a bus 18. The quantizer 20 quantizes the 64DCT elements using a 64-element quantization table 24, which must be specified as an input to the compression engine 10. Each element of the quantization table is an integer value from one to 255, which specifies the stepsize of the quantizer for the corresponding DCT coefficient. The purpose of quantization is to achieve the maximum amount of compression by representing DCT coefficients with no greater precision than is necessary to achieve the desired image quality. Quantization is a many-to-one mapping and, therefore, is fundamentally lossy. As mentioned above, quantization tables have been designed which limit the lossiness to imperceptible aspects of the image so that the reproduced image is not perceptually different from the source image.

The quantizer 20 performs a simple division operation between each DCT coefficient and the corresponding quantization table element. The lossiness occurs because the quantizer 20 disregards any fractional remainder. Thus, the quantization function can be represented as shown in Equation 2 below.

$$Y_Q[k,l] = \text{Integer Round}\left(\frac{Y[k,l]}{Q[k,l]}\right)$$

where Y(k,l) represents the (k,l)th DCT element and Q(k,l) represents the corresponding quantization table element.

To reconstruct the source image, this step is reversed, with the quantization table element being multiplied by the corresponding quantized DCT coefficient, but in so doing the fractional part is not restored. Thus, this information is lost forever. Because of the potential impact on the image quality of the quantization step, considerable effort has gone into designing the quantization tables. These efforts are described further below following a discussion of the final step in the JPEG compression technique.

The final step of the JPEG standard is an entropy encoding, which is performed by an entropy encoder 28. The entropy encoder 28 is coupled to the quantizer 20 via a bus 22 for receiving the quantized image data therefrom. The entropy encoder achieves additional lossless compression by encoding the quantized DCT coefficients more compactly based on their statistical characteristics. The JPEG standard specifies two entropy coding methods: Huffman coding and arithmetic coding. The compression engine of FIG. 1. assumes Huffman coding is used. Huffman encoding, as is known in the art, uses one or more sets of Huffman code tables 30. These tables may be predefined or computed specifically for a given image. Huffman encoding is a well known encoding technique that produces high levels of lossless compression. Accordingly, the operation of the entropy encoder 28 is not further described.

Referring now to FIG. 2, a typical JPEG compressed file is shown generally at 34. The compressed file includes a JPEG header 36, the quantization (Q) tables 38 and the Huffman (H) tables 40 used in the compression process, and the compressed image data 42 itself. From this compressed file 34 a perceptually indistinguishable version of the original source image can be extracted when an appropriate Q table is used. This extraction process is described below with reference to FIG. 3.

A JPEG decompression engine 43 is shown in FIG. 3. The decompression engine essentially operates in reverse of the compression engine 10. The decompression engine receives the compressed image data at a header extraction unit 44, which extracts the H tables, Q tables, and compressed image data according to the information contained in the header. The H tables are then stored in H tables 46 while the Q tables are stored in Q tables 48. The compressed image data is then sent to an entropy decoder 50 over a bus 52. The Entropy Decoder decodes the Huffman encoded compressed image data using the H tables 46. The output of the entropy decoder 50 are the quantized DCT elements.

The quantized DCT elements are then transmitted to an inverse quantizer 54 over a bus 56. The inverse quantizer multiplies the quantized DCT elements by the corresponding quantization table elements found in Q tables 48. As described above, this inverse quantization step does not yield the original source image data because the quantization step truncated or discarded the fractional remainder before transmission of the compressed image data.

The inverse quantized DCT elements are then passed to an inverse discrete cosine transformer (IDCT) 57 via bus 59, which transforms the data back into the time domain using the inverse discrete cosine transform. The inverse transformed data is then transferred to block-to-raster translator 58 over a bus 60 where the blocks of DCT elements are translated into a raster string of decompressed source image data.

From the decompressed source image data, a facsimile of the original source image can be reconstructed The reconstructed source image, however, is not an exact replication of the original source image.

As described above, the quantization step produces some lossiness in the process of compressing the data. By carefully designing the quantization tables, however, the prior art methods have constrained the loss to visually imperceptible portions of the image. These methods, and their shortcomings, are described below.

The JPEG standard includes two examples of quantization tables, one for luminance channels and one for chrominance channels. See International Organization for standardization: "Information technology—digital compression encoding of continuous—tones still images—part 1: Requirements and Guidelines, " ISO/IEC IS10918-1, Oct. 20, 1992. These tables are known as the K.1 and K2 tables, respectively. These tables have been designed based on the perceptually lossless compression of color images represented in the YUV color space.

These tables result in visually pleasing images, but yield a rather low compression ratio for certain applications. The compression ratio can be varied by setting a so-called Q-factor or scaling factor, which is essentially a uniform multiplicative parameter that is applied to each of the elements in the quantization tables. The larger the Q-factor the larger the achievable compression rate. Even if the original tables are carefully designed to be perceptually lossless, however, a large Q-factor will introduce artifacts in the reconstructed image, such as blockiness in areas of constant color or ringing in text -scale characters. Some of these artifacts can be effectively cancelled by post-processing of the reconstructed image by passing it through a tone reproduction curve correction stage, or by segmenting the image and processing the text separately. However, such methods easily introduce new artifacts. Therefore, these methods are not ideal.

As a result of the inadequacy of the Q-factor approach, additional design methods for JPEG discrete quantization tables have been proposed. These methods can be categorized as either perceptual, which means based on the human visual system (HVS) or based on information theory criteria. These methods are also designated as being based on the removal of subjective or statistical redundancy, respectively.

These methods form the Q table from two separate terms: a threshold term, chosen depending on the particular method selected, and a bit-rate term, chosen based on the desired compression ratio. This is shown graphically in FIG. 4.

The flowchart in FIG. 4 shows a basic three-step process of forming a Q-table according to prior art methods. First, a so-called threshold term is selected in step 64. The term is referred to as "threshold" because it relates to the HVS thresholds, below which the quantization is perceptually lossless. Second, a bit-rate term is selected in step 66. This is essentially the Q-factor described above. The bit-rate term can be thought of as a normalization factor that allows the control of the bitrate of the compressed image. This factor is important for applications having a limited channel bandwidth (e.g., FAX) or with limited storage space (e.g., digital cameras). Finally, the Q-table is formed in step 68 using both of these terms. Typically, this step just involves dividing a threshold term by a corresponding bit-rate term. Each of these steps is described further below.

Referring now to FIG. 5, a flowchart showing the two methods, statistical and subjective, for determining the threshold term is shown. Both methods begin by selecting a set of typical images in step 70. This set is chosen to represent the desired image characteristics so that the Q-table is optimized for these images. Next, the particular method is chosen. If a statistical or information theoretical method is chosen, steps 74 and 76 are executed, while if a perceptual or subjective method is desired, steps 78 and 80 are instead executed.

In the statistical or information theoretical method, the threshold term is chosen based on the energy within an 8×8 block of DCT transformed image data. The energy is typically represented by the variance of the DCT elements across the entire image. The quantization levels are then allocated in abundance to the DCT basis vectors having larger variances. Conversely, those quantization levels having a smaller variance have fewer quantization levels. The problem with these methods is that they do not take into account the HVS and, as a result, the generated solutions may produce reconstructed images of poor visual quality. Some have tried to attenuate this result by combining the statistical method with multi-level error diffusion. In this refined method, the error made in the quantization is diffused to an adjacent DCT element. These refined methods, however, are more computationally intensive and do not fully restore the visual quality of the image.

In the subjective or perceptual methods, an error or difference between the compressed and uncompressed image is adjusted to the threshold of detectability of the human visual system (HVS). This is accomplished in the two steps 78 and 80 shown in FIG. 5. In the first step 78, a difference is computed between the original and compressed images. This difference is used in step 80 to allocate the bandwidth so that the difference image is below the detection threshold. The detection threshold is established using psychophysical experiments. The process of establishing the threshold using the psychophysical experiments further comprises two steps. In the first step, the perceptual color space is used to develop a detection model for a specific class of features by performing the psychophysical experiments. In the second step, this model is applied to predict the visibility thresholds for the quantization errors. The threshold terms are then chosen so that the errors are just below the threshold level.

This subjective or perceptual method, as well as others such as the "contrast masking" method proposed by Robert J. Safranek, "JPEG compliant encoder utilizing perceptually based quantization," *Human Vision, Visual Processing, and Digital Display* V1913, 117–126, SPIE, 1993, address the task of perceptually lossless compression. For many applications, e.g., color facsimile, the generated solutions are too conservative in that the achievable compression rate is too low. For color facsimile applications, this low compression ratio produces unacceptable transmission times. Furthermore, the images used in the psychophysical experiments to characterize the HVS are sine wave gratings. While these sine wave gratings adequately represent pictorial images, used indiscriminately such targets do not predict well the perception of text. Consequently, these perceptual methods do not effectively control artifacts in text such as ringing around characters.

Hybrid forms of these statistical and subjective methods described above have been proposed which try to take the best of both methods. Although a frequency component might have a high variance, it might not be very significant for contributing information to the HVS. Therefore, for a given image, the image quality can be improved by reallocating the transmission bandwith to perceptually important information while attenuating information not perceptible. Alternatively, for a given perceptual quality, the number of bits required to encode a pixel can be reduced.

An example of such a hybrid method can be found in David L. McLaren and D. Thong Nguyen, "Removal of Subjective Redundancy from DCT-coded Images," *IEE Proceedings-I*, 138, 5, 345–350, 1991. The McLaren and Nguyen method, instead of using a uniform Q-factor, separates the coefficient thresholding from the quantization stages. By considering the coefficient energy distribution and the contrast sensitivity curve of the HVS, the method harshly thresholds the DCT coefficients, obtaining substantially better bit rates without perceptually degrading the images. This method, however, was designed using video images. One characteristic of video images is the substantial cross-talk in the transducers, which "smoothens" the images. For instance, text in video images is typically large so that this problem can be reduced. In color facsimile communication, there is much less cross talk because hard edges are desirable. Moreover, color scanners typically have problems of sensor misalignment and images are often half-toned, which introduces interference patterns. These artifacts, typical for color facsimile, can adversely bias the statistical analysis of coefficient energy as taught in McLaren and Nguyen.

In another hybrid method proposed by K. R. Rao and his co-workers, (see, e.g., Bowonkoon Chitprasert and K. R. Rao, "Human Visual Weighted Progressive Image Transmission," *IEEE Transactions on Communications*, COM-38,7,1040–1044, 1990) a perceptual model is used for classification of the data to establish a transmission hierarchy. In a first step, a Q table is generated based on estimates of energy in each 8×8 block. In a second step, a modulation transfer function (MTF) is empirically determined for the HVS and the MTF is multiplied by the DCT coefficients at the corresponding frequencies. For progressive transmission, the resulting weighted coefficient sub-blocks are sorted according to their AC energy into classes. As in the McLaren and Nguyen method, however, the work of Rao, et al., focuses on pictorial images at low resolution for either television or low resolution computer video displays. Color facsimile communication takes place at higher resolutions and most of the time contains text. Accordingly, these methods are not particularly well suited for color facsimile data.

A third hybrid method has been proposed by Siegel that has some resemblance to Safranek's method. See U.S. Pat. No. 5,063,608 entitled, "Adaptive Zonal Coder," issued to Shepard L. Siegal. In Siegel's method, just before the entropy encoder, each block is scanned and a running block activity measure, such as the running sum of squares or absolute values, is computed. If there are sufficient low frequency terms, according to Siegel the higher frequency terms are of less importance and, due to the nature of human visual response, may be omitted without perceived image degradation. This method, however, is computationally intensive and thus may make a hardware implementation impractical. Moreover, Siegel's method may not be well suited for typical color facsimile data which typically includes a combination of text and graphics.

Accordingly, a need remains for a method for selecting JPEG quantization tables which is particularly adapted to color facsimile applications.

SUMMARY OF THE INVENTION

The invention is a method of forming a quantization table which is particularly well adapted for color facsimile applications. The method includes a first step of selecting a threshold term that results in perceptually lossless quantization of the image. In a second step, a bit rate term is selected so that the expected value of the compressed image equals a predetermined size. In a third step, a "suprathreshold" term is selected which results in perceptually lossy compression but where the loss does not impact the visual quality of the image. The visual quality of the image is measured relative to the visual acuity or visual resolution of the image and the contrast sensitivity of an observer. Finally, these three terms are combined to form a corresponding quantization table element. The addition of the "supra-threshold" term allows for improved compression ratios while preserving the visual quality of the image.

The step of selecting a "supra-threshold" term includes a step of selecting a set of target images, where each target image includes one or more image elements such as text. These image elements are then analyzed to identify those that are critical for visual quality. The "supra-threshold" term is then selected in order to give a larger weight to the table elements that correspond to the critical image elements and a smaller weight to the table elements that do not correspond to the critical image elements. This final step is performed by understanding the characteristics of each DCT basis factor. Let us assume the critical elements are predominantly vertical and horizontal, and only to a lesser extent diagonal. By giving larger weights to the table elements that correspond to the "up-downness" of the image, i.e., the vertical attributes of the image elements, and the "left-rightness" of the image, i.e., the horizontal attributes of the image elements, and smaller weights to the table elements corresponding to the "criss-crossedness" of the image i.e., the diagonal attributes of the image elements, the visual quality of the image can be preserved while significantly increasing the compression ratio.

The foregoing and other objects, features and advantages of the invention will become more readily apparent from the following detailed description of a preferred embodiment of the invention which proceeds with reference to the accompanying drawings. Although described hereinafter by reference to a preferred JPEG standard system, other imaging systems—e.g., MPEG or a nonstandard system could employ the invention.

DETAILED DESCRIPTION OF THE PREFERRED EMBODIMENT

Figure 1:
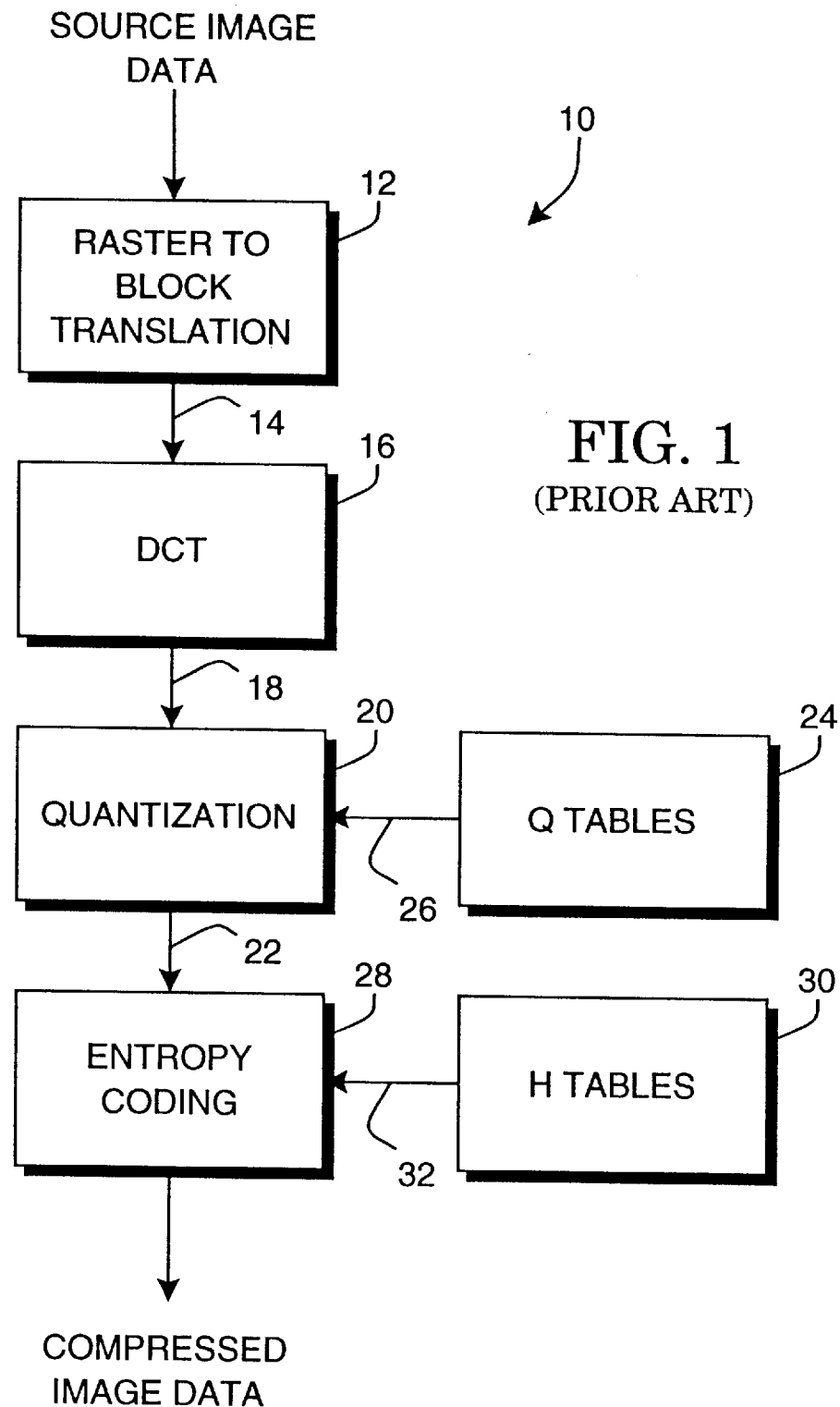
FIG. 1 is a block diagram of a prior art JPEG compression engine.

Two factors are crucial for the success of a color facsimile product-transmission time and price. Both of these crucial factors are affected by the implementation of the JPEG compression standard, which is the standard adopted for color facsimile communications. A typical binary text page contains approximately 20K bytes of compressed data. Over a standard 9600 baud line, this text image can be transmitted in about 20 seconds. In contrast, an A-size color image at 200-dots-per-inch (dpi) resolution requires approximately 11 megabytes of uncompressed image storage. In order to transmit this image even within 90 seconds (4-½ times that required for the binary text page) the image must be compressed by a ratio of greater than 1:100. The compression rate achieved using a typical JPEG implementation the color facsimile test chart CP01, on the other hand, is only 1:36. To be compliant with the JPEG standard, the only parameters that can be changed to improve the compression performance are the discrete quantization tables (Q-tables) and the Huffman tables (H-tables). There is a finite limit to the compression ratios achievable using the lossless Huffman entropy encoding. Therefore, to achieve the desired compression ratios, the burden must fall on the Q-tables. However, as described above, the quantization process produces a lossy compression of the image.

The methodology of designing a Q-table according to the invention, hereinafter described, produces a perceptually lossy data compression; however, the visual quality of the image is preserved. In other words, instead of avoiding physical artifacts, the methodology confines these artifacts to image components that are not visually important. There are currently no metrics for visual quality of color facsimile documents. The methodology according to the invention focuses on considerations that from an empirical point of view do not impair visual quality.

The method of the invention categorizes the contents of color facsimile images into three classes: text, pictorial images, and graphical artwork. Exploiting the "up-downness" and "left-rightness" characteristics of the DCT basis elements, the individual Q-table elements are weighted according to their relative impact on particular image elements within these various classes. In particular, the method emphasizes characteristics of text by identifying critical parts of latin letters and preserving their characteristics throughout the quantization process. This is possible because of the recognition that, within a window covering three adjacent DCT basis vectors, coefficient energy in the discrete cosine transform (DCT) does not depend on the phase angle.

The methodology according to the invention also does not add to the cost of implementing the JPEG standard. This is an important consideration for products targeted at the consumer electronics market such as a color facsimile machine. The methodology does not impact the cost because the Q-tables are predetermined and stored as constants in the system memory. This is in contrast to the dynamic methods that process the image on the fly to form the Q-tables or that post-process the image.

Figure 6:
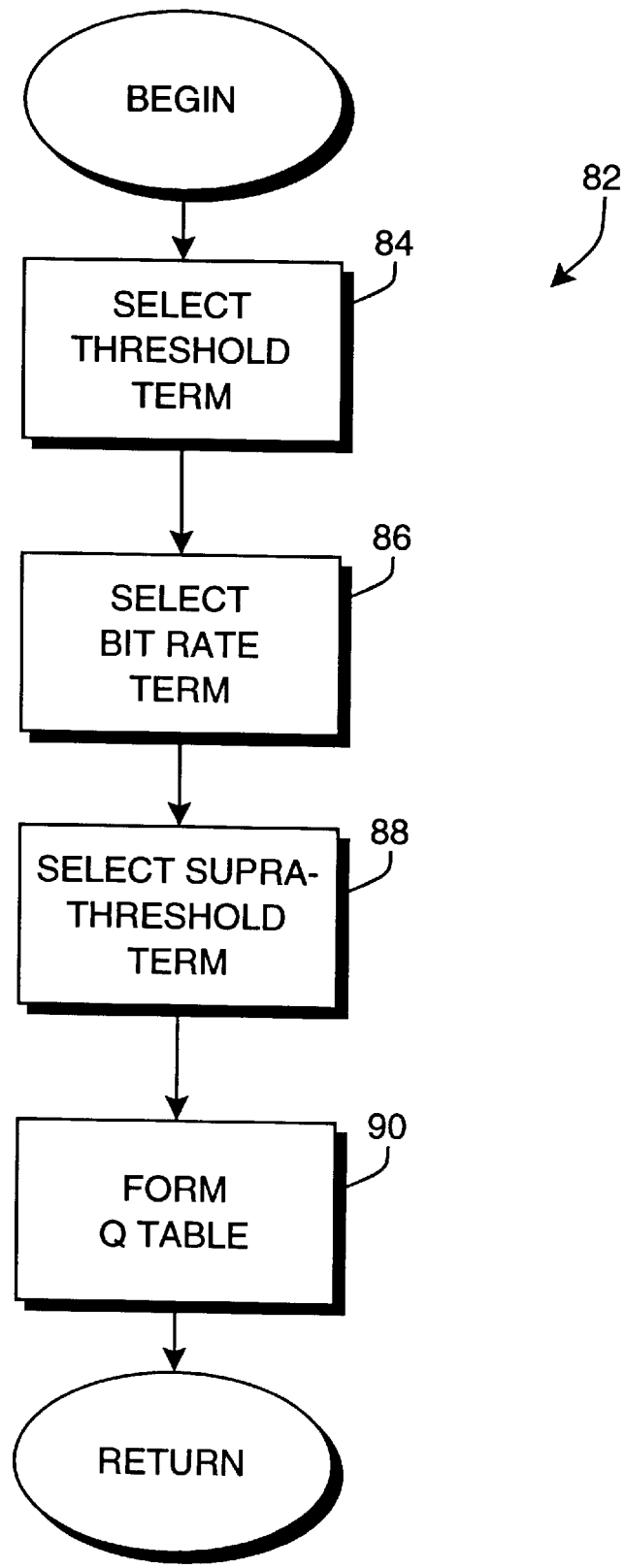
FIG. 6 is a flowchart showing a method of forming a quantization table for use in compression of images according to the invention.

Referring now to FIG. 6, a method 82 of forming a quantization table according to the invention includes four basic steps. In the first step 82, a threshold term is selected. The prior art perceptual or informational theory based methods, as described above, can be used in this step. In the second step 86, a bit rate term is selected so that the expected value of the compressed image size equals a predetermined size. This step, too, can be implemented by a prior art method. It is described further below with reference to FIG. 7.

In a third step 88, according to the invention, a "supra-threshold" term is selected. The term is referred to as "supra-threshold" because it falls outside the contrast sensitivity curve and thus cannot be selected according to the methods found in the prior art. Finally, in step 90 the three terms are combined to form the Q-table. This can be a simple multiplicative step and, therefore, can be expressed as a mathematical expression.

Figure 7:
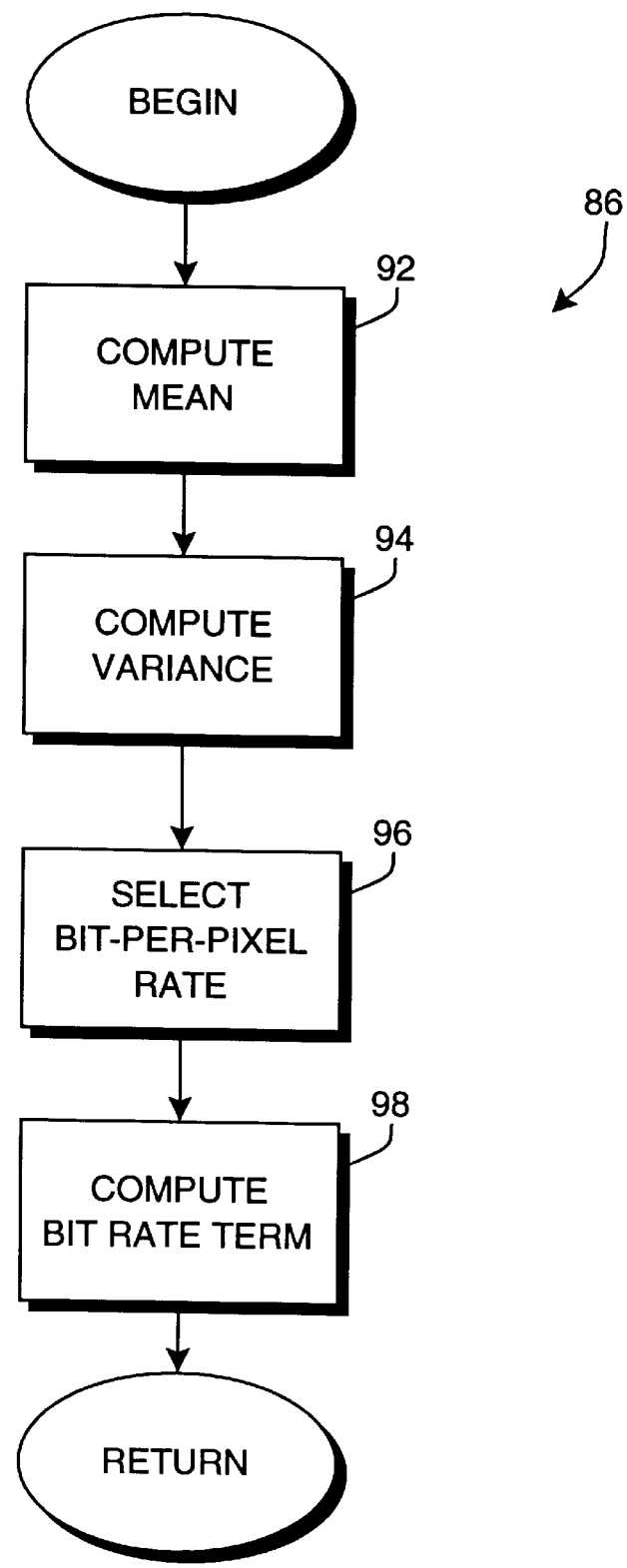
FIG. 7 is a flowchart showing the step of selecting a bit rate term for use in forming a quantization table in either of the methods shown in FIGS. 4 or 6.

Referring now to FIG. 7, the method of selecting a bit rate term 86 is shown. The first step 92 is to compute the mean of the DCT elements ($Y_i[k,l]$) across all of the blocks (B) in the image. The mean of each of the DCT elements ($M_y[k,l]$) can then be expressed by the following formula:

$$M_y[k,l] = \frac{1}{B} \sum_{i=1}^{B} Y_i[k,l]$$

Once the mean has been computed, the variance ($V_y[k,l]$) for each DCT basis factor is then computed in step 94 according to the following formula:

$$V_y[k,l] = var(Y[k,l]) = \frac{1}{B} \sum_{i=1}^{B} (Y_i[k,l] - M_y[k,l])^2$$

Next, a bit-per-pixel rate (BPP) is selected in step 96. The BPP is empirically derived and represents the overall bits-per-pixel rate of the compressed image. This rate does not represent a real bit-rate. In practice, one has to experiment with different values and select a value for which the visual quality is acceptable. For example, in color facsimile images BPP equal to 4 yields images that are perceptually lossless. Bits-per-pixel rates lower than 2.5, however, can introduce undesired artifacts into the resulting image.

Finally, the bit rate term of the quantization table is computed in step 98. This bit rate term is a function of the number of bits allocated ($N_{k,l}$) for a given DCT basis factor (k,l). The number of bits allocated $N_{k,l}$ can be expressed as follows:

$$N_{k,l} = \frac{1}{2} \log_2 \left[ \frac{V_y[k,l]}{D} \right]$$

Where D is defined by solving the following equation:

$$64 \cdot BPP = \sum_{k=0}^{7} \sum_{l=0}^{7} N_{k,l} = \frac{1}{2} \sum_{k=0}^{7} \sum_{l=0}^{7} \log_2 \left[ \frac{V_y[k,l]}{D} \right]$$

Finally, the preliminary quantization table elements Q [k,l] of the Q-table are defined as:

$$Q[k,l] = \frac{2048}{2^{N_{k,l}}}$$

where 2,048 represents the maximal range that the output of the discrete cosine transform may have, namely [−1,024, 1,024].

The method of selecting the bit rate term 86 yields discrete quantization tables that result in good compression ratios at an acceptable visual quality. The compression ratio is insufficient, however, for color facsimile applications. Thus, the step of selecting a "supra-threshold" is added to provide an additional level of compression which preserves the visual quality of the image.

The step 88 of selecting the "supra-threshold" allows for a coarsened quantization of information that is not important for the visual quality of the image. "Not important" as it is used herein means that it does not impact either the readability or the aesthetic quality of the image. This technique can be perceptually lossy, i.e., at supra-threshold levels, hence the name. Intuitively, this term seeks to preserve certain critical elements of images that relate to the readability or aesthetic quality of the image. For text, which is of particular concern for facsimile applications but which have largely been ignored in the prior art, there are certain features that fall into this category.

Typefaces have evolved over many years and have been extensively redesigned for specific applications. In the art of typographic design, it is known empirically that the body of text set in a font with serifs is more readable than the same text in a sans serif font, even when the typeface is the same. The step of selecting "supra-threshold" term takes advantage of this fact to derive a criterion to design the JPEG quantization tables that does not impair the reading performance as quantified by the data available on the HVS.

Figure 9:
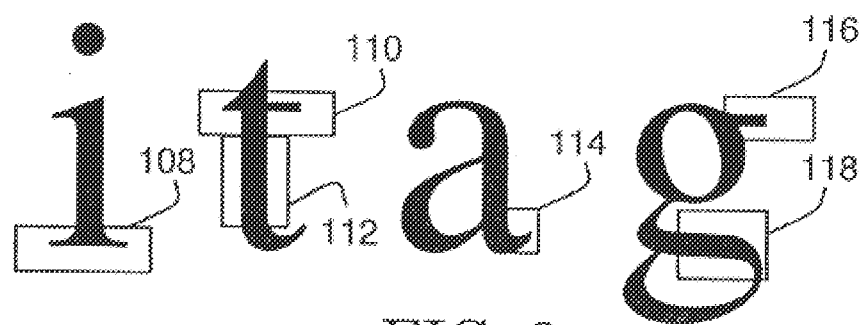
FIG. 9 is a drawing showing the critical image elements identified by the method of FIG. 8.

There are various parts or elements of a letter that are critical for the reading efficiency of text. Accordingly, the method according to the invention tends to preserve these critical character parts in the image compression process. Examples of these important elements are shown in FIG. 9. These elements include, but are not limited to, the serif 108, the bar 110, the stem 112, the terminal 114, the ear 116, and the stress 118. Because of the impact that these elements have on the readability or the visual quality of the image, the step of selecting the "supra-threshold" term attempts to preserve these elements while allowing for compromise in the other elements of the text.

Figure 10:
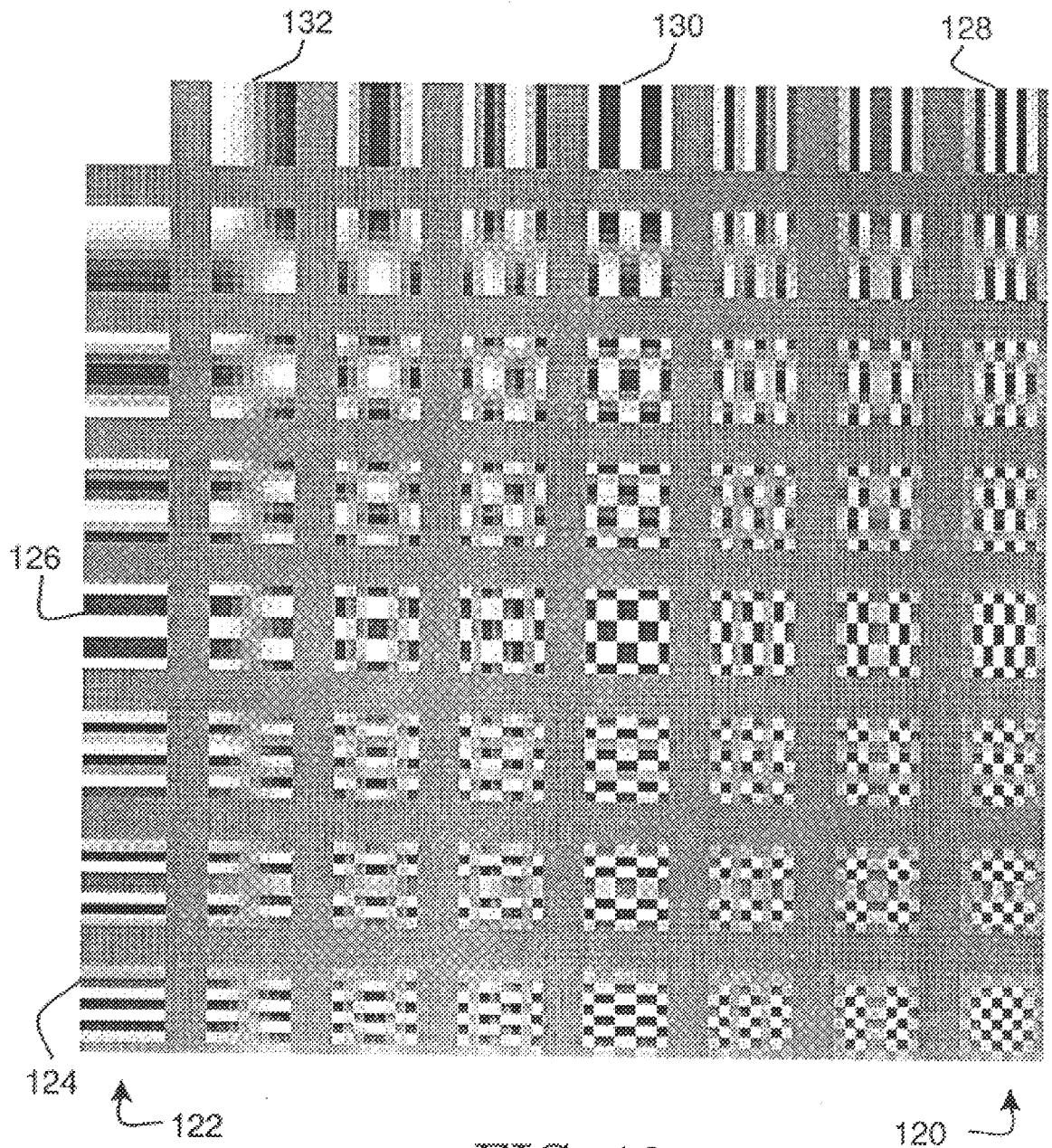
FIG. 10 is a drawing showing a conceptual or spatial representation of the DCT basis vectors.

To preserve these features this step takes advantage of the intuitive or conceptual properties of the discrete cosine transform (DCT). The 64point DCT matrix can be represented conceptually as shown in FIG. 10, which is taken from R. J. Clarke, "Spectral Response of the Discrete Cosine in Walsh Hadamard Transforms," *IEEE Proc*, 130, part F, 309–313, 1983. It can be seen from FIG. 10 that the first row of DCT basis vectors, as shown generally at 120, intuitively represents the vertical or "up-downness" characteristics of the image. Similarly, the first column, shown generally at 122, represents the horizontal or "left-rightness" of the image, while the diagonal of the matrix represent the "criss-crossedness" of the image.

Another important observation concerning FIG. 10 is that each element represents a certain spatial frequency. For example, basis vector 124 has a distinct alternating pattern of light and dark bars at the fundamental frequency of the DCT, which correspond to the resolution of the image data, i.e., the pixel size. Thus, DCT basis vector 124 should not only represent the horizontal or "right-leftness" of the image but further those horizontal features having only a single pixel width. Similarly, DCT basis vector 126 can be thought to represent two pixel wide horizontal features because of the strong two bar wide alternating pattern that emerges. The same intuitive reasoning can be applied to all of the elements of the DCT matrix. For example, basis vectors 128 and 130 are the vertical equivalents of basis vectors of 124 and 126, respectively.

The method of forming a Q-table according to the invention takes advantage of two results from Clarke's above-cited paper. Clarke's paper demonstrates that in terms of coefficient energy, detail of a given spatial frequency in image data, irrespective of phase angle, resides almost totally within three coefficients in the transform domain when a 16-point DCT is applied. The method according to the invention uses these two results to weight certain DCT elements so as to preserve important elements or features of an image, e.g., serifs.

Referring again to FIG. 8, the method 88 of selecting a "supra-threshold" term as shown. The "supra-threshold" term can be considered a weighting factor (w[k,l]) for each element in the Q-table. The bit allocation ($N_{k,l}$) equation above can then be modified to incorporate this weighting factor as follows:

$$N'_{k,l} = \frac{1}{2} \cdot \log_2 \left[ w[k,l] \cdot \frac{V_y[k,l]}{D} \right]$$

It is apparent from the modified bit allocation equation ($N'_{k,l}$) that the larger the "supra-threshold" term, the more bits, on average, that will be allocated for a particular DCT basis factor. On the other hand, the smaller the "suprathreshold" term, the fewer bits, on average, will be allocated to the corresponding DCT basis factor. The "suprathreshold" term, in the preferred embodiment, lies within the range of zero to one.

Figure 8:
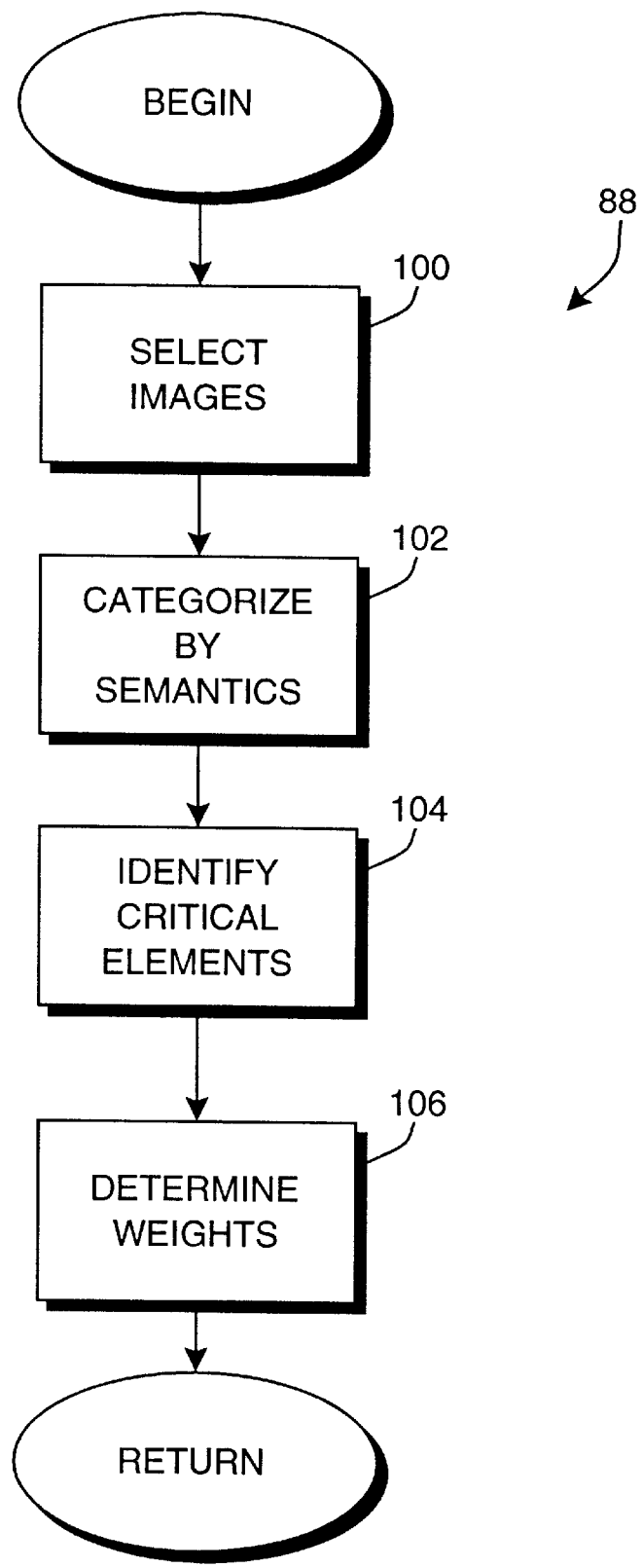
FIG. 8 is a flowchart showing the step of selecting a "supra-threshold" term, in accordance with the invention, for use in forming a Q table according to the method of FIG. 6.

As shown in FIG. 8, the first step 100 of selection of the supra-threshold term 88 is to select a set of typical images for a given application. For color facsimile applications, for example, a set of images can include a page from a catalog, a page from a book, a typographical map, and a real estate flyer. These are images that would typically be sent by facsimile, assuming a cost effective color facsimile were available. For other applications, a different exemplary set of images would be chosen in this step.

The next step 102 is to categorize the images by their semantic contents. In this step, the images are separated into three basic categories: text, graphics, and pictorial images. Other semantic distinctions can be made, however, depending on the application. These three categories were chosen for color facsimile applications because most typical images include one or more of these three categories.

After the images have been categorized, the critical elements in each category are identified in step 104. This is a heuristic step that identifies elements in the image that are critical for visual image quality. For example, as described above, there are certain elements of text that are critical for the visual quality or readability of the text. Thus, for the text category above, assuming a Latin serif typeface, step 104 would identify the ears, bars, stems, stresses and serifs, which are important for reading efficiency. Similarly, if another typeface is used such as other Latin typefaces (e.g., scripts, grotesque, decorative, display, or black letter), or non-Latin typefaces (e.g., Nirnaya Sagara, Devanagari, Naskh Arabic script, Kanji and Hiragana), the elements that are important for the visual quality of those typefaces are identified in step 104. This step could be extended to glyphs in general, like dingbats and bar codes.

The final step is to determine the appropriate weight in step 106 in order to give a larger weight to DCT basis vectors that preserve these critical elements and lower weights to those that are not critical. This step further comprises two steps. In the first step, the important elements identified in step 104 are measured to determine their size. In the second step, these important element sizes are matched with a corresponding DCT basis vector. This matching step is done by recognizing the intuitive attributes of the DCT basis vector elements. As described above, the DCT basis vectors as graphically represented in FIG. 10 have a sort of physical dimensionality that is a function of the resolution of the source image. For example, DCT basis vector 124 in FIG. 10 corresponds to one pixel wide horizontal attributes while DCT basis vector 126 corresponds to two pixel wide horizontal attributes. Thus, in this final step, if a critical image element is approximately is two pixels wide, a large weighting factor is associated with DCT basis vector 126. Similarly, if a critical image element is approximately four pixels high, such as stem 112, a large weighting factor would be associated with DCT basis vector 132, which intuitively represents those types of attributes.

This process of assigning weighting factors can further be decomposed into a series of steps. First, the largest weight is assigned to those basis vectors that directly correspond to the important image elements, as described above. Next, a second, smaller weight is assigned to DCT basis vectors adjacent to those having the largest weight, i.e., those corresponding to the critical elements. A third weight between the first and second weights are assigned to those DCT basis vectors that have two or more neighboring elements of the first weight. Next, a fourth weight is assigned to DCT basis vectors that are adjacent to, or neighbors of, those having the second weight. Finally, any remaining elements are assigned a fifth weight which is the smallest of all the weights.

In the preferred embodiments, the first weight is equal to 1, the second weight is equal to ½, the third is equal to ¾, the fourth is equal ¼, and the fifth is equal to ⅛. A sample table optimized for 300 dpi textual images is shown below.

$$\begin{Bmatrix} \frac{3}{4} & 1 & 1 & \frac{3}{4} & 1 & \frac{3}{4} & 1 & 1 \\ 1 & \frac{3}{4} & \frac{1}{2} & \frac{1}{4} & \frac{1}{2} & \frac{1}{4} & \frac{1}{2} & \frac{1}{2} \\ 1 & \frac{1}{2} & \frac{1}{4} & \frac{1}{8} & \frac{1}{4} & \frac{1}{8} & \frac{1}{4} & \frac{1}{4} \\ \frac{3}{4} & \frac{1}{4} & \frac{1}{8} & \frac{1}{8} & \frac{1}{8} & \frac{1}{8} & \frac{1}{8} & \frac{1}{8} \\ 1 & \frac{1}{2} & \frac{1}{4} & \frac{1}{8} & \frac{1}{8} & \frac{1}{8} & \frac{1}{8} & \frac{1}{8} \\ \frac{3}{4} & \frac{1}{4} & \frac{1}{8} & \frac{1}{8} & \frac{1}{8} & \frac{1}{8} & \frac{1}{8} & \frac{1}{8} \\ 1 & \frac{1}{2} & \frac{1}{4} & \frac{1}{8} & \frac{1}{8} & \frac{1}{8} & \frac{1}{8} & \frac{1}{8} \\ 1 & \frac{1}{2} & \frac{1}{4} & \frac{1}{8} & \frac{1}{8} & \frac{1}{8} & \frac{1}{8} & \frac{1}{8} \end{Bmatrix}$$

The table above was constructed by assigning a weight of one to those DCT basis vectors corresponding to vertical or horizontal sequences of one, two, or four pixels, which correspond to the critical image elements for text. These elements were chosen based on a measurement of 11 point Times Roman fonts. For this font the stems and stresses are approximately 0.3 mm, the ears and bar thicknesses approximately 0.12 mm, and the ears and terminal lengths approximately 0.3 mm. Thus, the stems and stresses, as well as the ear and terminal length, correspond to a four pixel sequence, while the ears and bar thickness correspond to a two pixel sequence both at 300 dpi. These features are also predominantly horizontal and vertical, which correspond to the first vertical column and the first horizontal row of the DCT matrix, respectively. The preferred embodiment of the invention also assigns the largest weight to the DCT element corresponding to peak contrast sensitivity.

Similar tables can be constructed for different types of images. For example, Table 2 below is additionally optimized for graphic images using the same methodology described above. In addition to weighting heaviest those DCT basis vectors that preserve the image elements most important to the visual quality of textual images, the first weight is assigned to those elements that preserve the important image elements for graphics, e.g., large half-tone dot sizes. It turns out that graphic images, as in the case of text images, have many critical image elements along the first row and the first column of the DCT matrix. The reason is that graphic images have predominant horizontal and vertical attributes. For the set of images chosen, however, the sizes of these critical elements are different, as seen by the largest weights in different positions that in Table 1.

In these tables, decimal weights can be substituted for fractions and can be varied from the actual weights shown to refine the relative weighting.

$$\begin{Bmatrix} 1 & 1 & 1 & \frac{3}{4} & 1 & \frac{3}{4} & 1 & 1 \\ 1 & \frac{3}{4} & \frac{1}{2} & \frac{1}{4} & \frac{1}{2} & \frac{1}{4} & \frac{1}{2} & \frac{1}{2} \\ 1 & \frac{1}{2} & \frac{1}{4} & \frac{1}{8} & \frac{1}{4} & \frac{1}{8} & \frac{1}{4} & \frac{1}{4} \\ \frac{3}{4} & \frac{1}{4} & \frac{1}{8} & \frac{1}{8} & \frac{1}{8} & \frac{1}{8} & \frac{1}{8} & \frac{1}{8} \\ 1 & \frac{1}{2} & \frac{1}{4} & \frac{1}{8} & \frac{1}{8} & \frac{1}{8} & \frac{1}{8} & \frac{1}{8} \\ \frac{3}{4} & \frac{1}{4} & \frac{1}{8} & \frac{1}{8} & \frac{1}{8} & \frac{1}{8} & \frac{1}{8} & \frac{1}{8} \\ 1 & \frac{1}{2} & \frac{1}{4} & \frac{1}{8} & \frac{1}{8} & \frac{1}{8} & \frac{1}{8} & \frac{1}{8} \\ 1 & \frac{1}{2} & \frac{1}{4} & \frac{1}{8} & \frac{1}{8} & \frac{1}{8} & \frac{1}{8} & \frac{1}{8} \end{Bmatrix}$$

Figure 11:
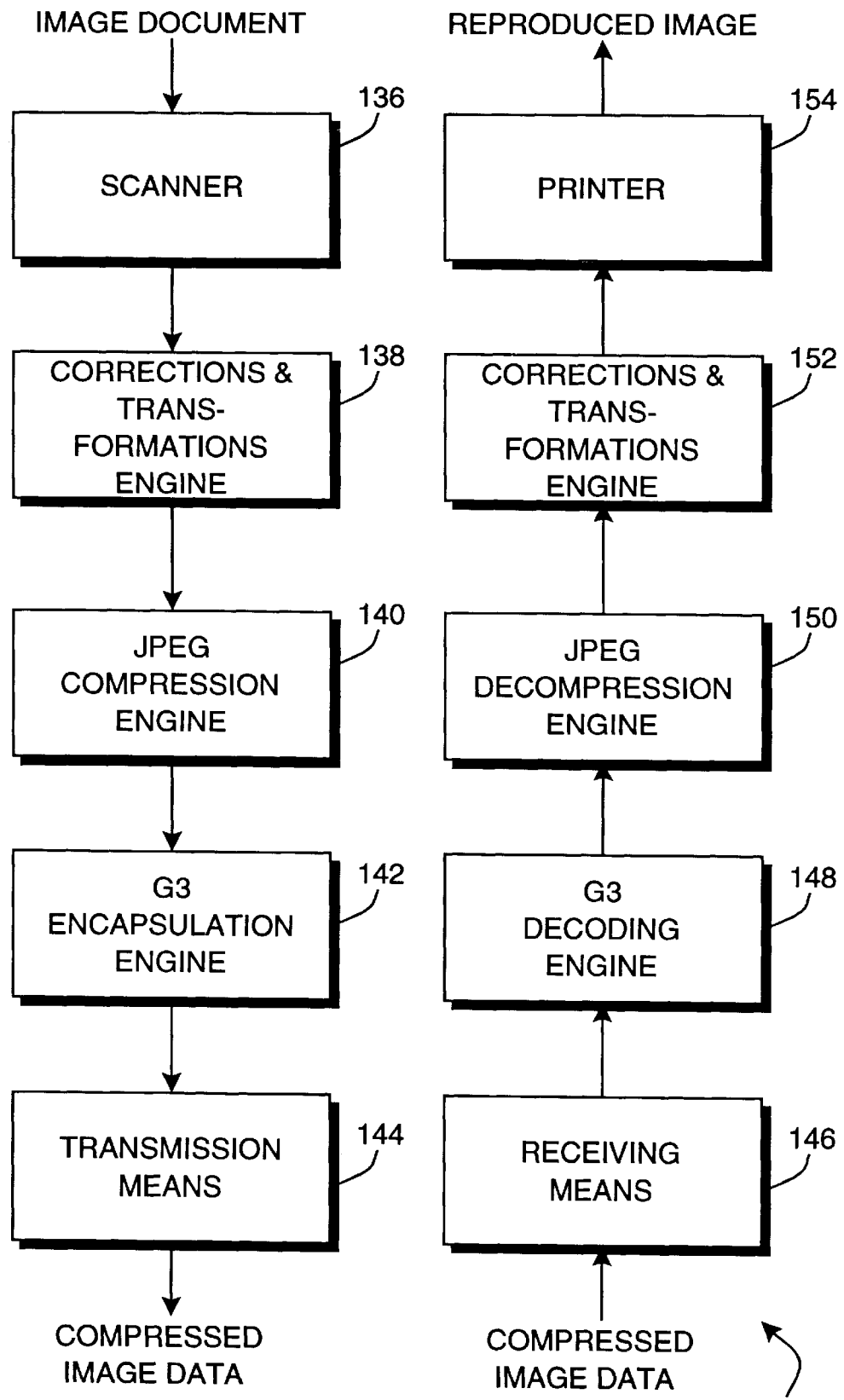
FIG. 11 is a block diagram of a color fax machine using the quantization tables formed according to the invention.

A color facsimile (fax) machine 134 using the JPEG engine according to invention is shown in FIG. 11. The color facsimile machine 134 is but one example of an application for the JPEG-compatible compression engine of the invention. The quantization tables formed by the above described method can be used in any context that requires JPEG compression as well as in machines that operate according to similar principles but which are not JPEG-compliant. These applications are typically those that have limited or finite bandwidth capability. An example of another such limited bandwidth application is a personal computer or work station. In these applications color images are displayed on the screen, which can be represented in a variety of different formats such as Postscript. JPEG compression can be used to compress these color images to allow for more efficient transmission of the compressed image over the limited bandwidth channel.

The color facsimile machine 134 includes two related but independent components: a send component and a receive component. The send component includes a color scanner 136 which receives a physical image document and which renders or transforms the physical image into color source image data such as found in the ScanJet IIc™ manufactured by Hewlett Packard of Palo Alto, Calif. The color source image data is then passed to a corrections and transformation engine 138, which can correct for certain anomalies in the scanner and format the source color image data appropriately. This transformation can include transforming the color source image data from one color space, e.g., RGB, to another, e.g., CIELAB.

The corrected and transformed color source image data is then passed to a JPEG compression engine 140, which includes the quantization tables formed in accordance with the invention described herein. The JPEG compression engine compresses the source image data into compressed image data in the manner described above, which is then passed onto a G3/G4 encapsulation engine 142. The encapsulation engine 142 performs the step of encapsulating the compressed image data in accordance with the amended T.30 Group 3 Facsimile Standard or the Group 4 Facsimile Standard (G4). The encapsulated data is then transmitted via a transmission means 144 over the limited bandwidth channel. In the preferred embodiments, this transmission means includes a modem (modulator), but can also include direct digital transmission circuitry.

Figure 2:
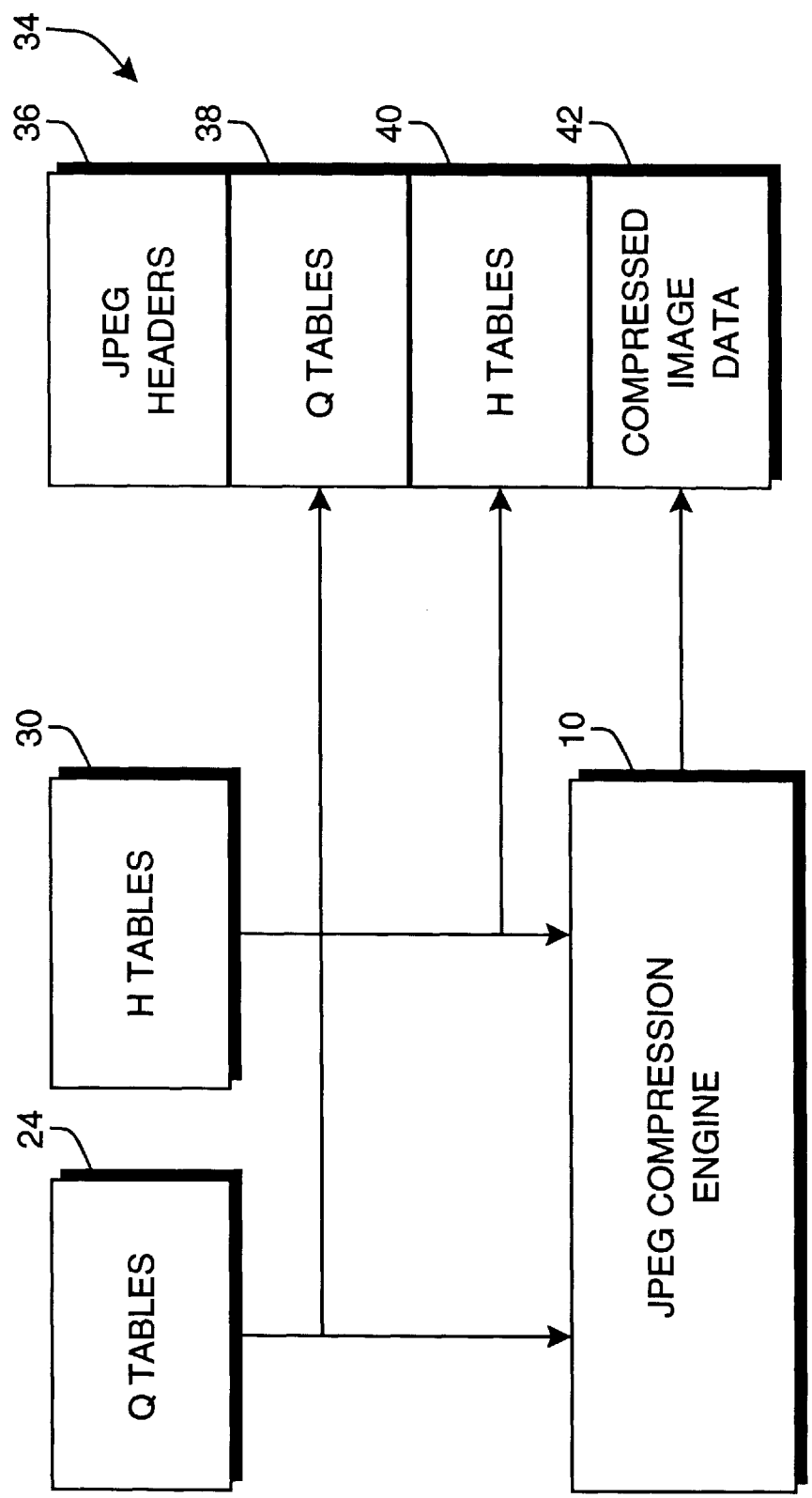
FIG. 2 is a drawing of a typical format of a JPEG compressed file.
Figure 3:
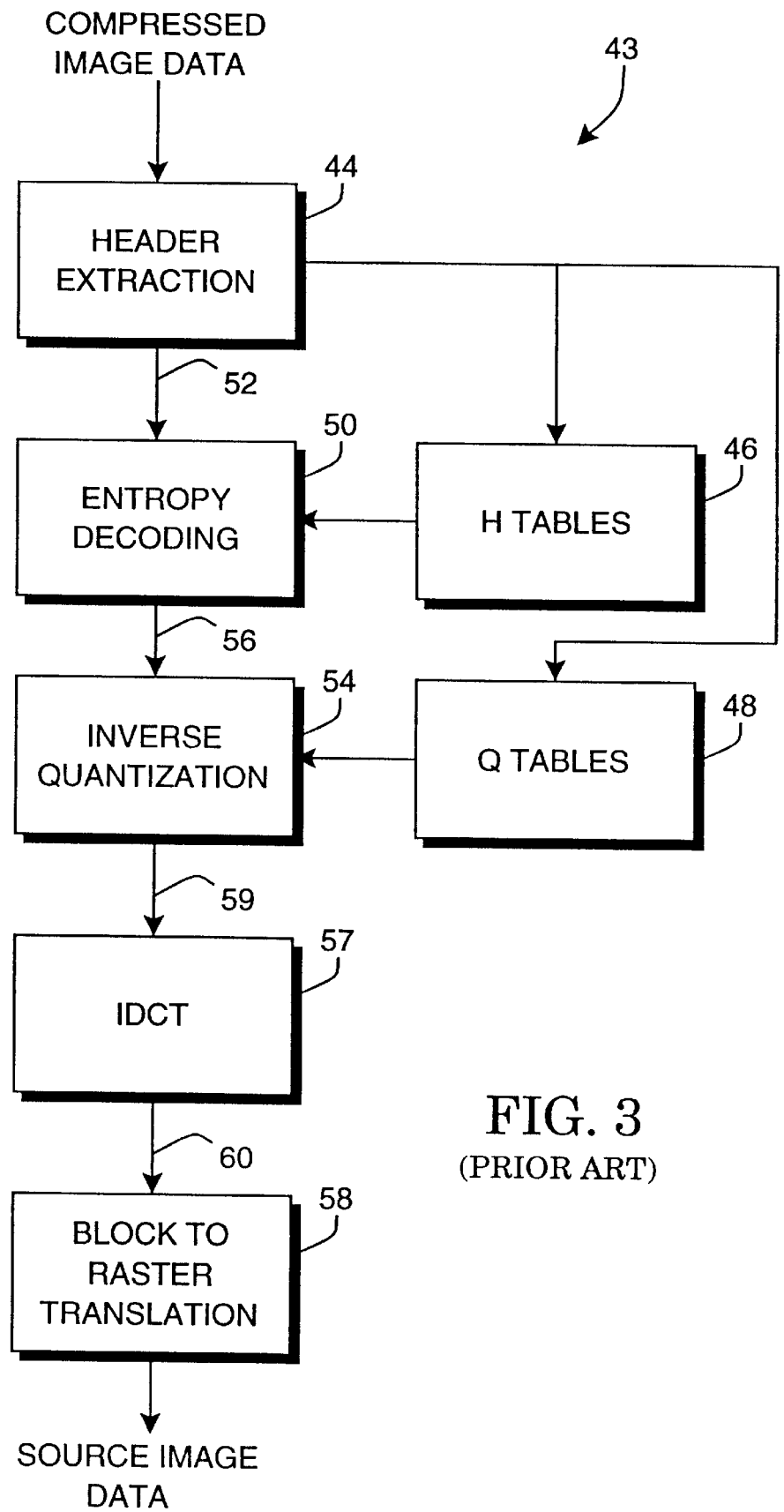
FIG. 3 is a block diagram of JPEG decompression engine.
Figure 4:
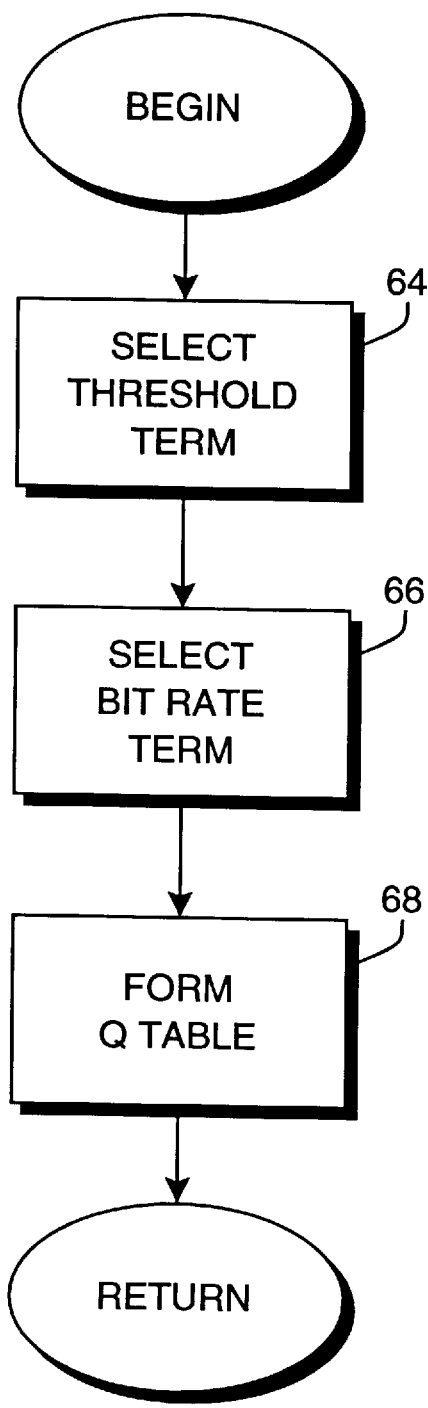
FIG. 4 is a flowchart of a prior art method of forming a quantization table for compressing images in accordance with the JPEG standard.
Figure 5:
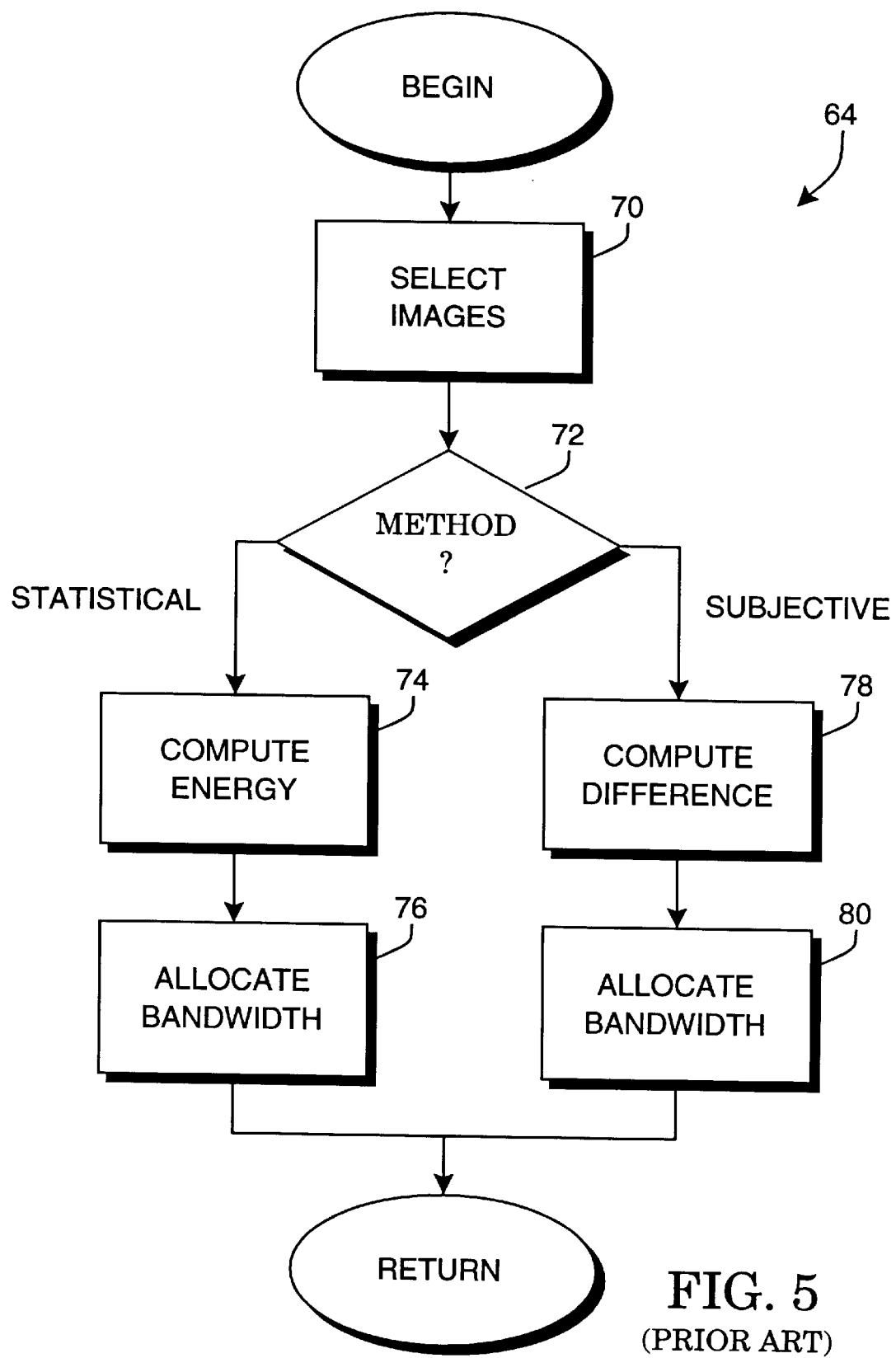
FIG. 5 is a flowchart showing the two prior art methods for selecting a so-called "threshold" term which is used to form the Q table in the method of FIG. 4.

On the receiving end, the color fax 134 includes a receiving means 146, which in the preferred embodiment uses the modem (demodulator) of the transmission means 144. The received compressed image data is then decoded by a G3/G4 decoding engine 148. The engine 148 decodes or unencapsulates the compressed image in accordance with the applicable Group 3 or Group 4 facsimile standard. The decoded compressed image data is then decompressed by a JPEG decompression engine 150. This decompression engine can be that shown in FIG. 3 above but with the quantization tables used therein being those formed in accordance with the invention, which tables are included in the compressed image data as shown in FIG. 2.

The decompressed source image data is then passed to a corrections and transformations engine 152, which transforms the source image data into the color space required by a color printer 154 included in the color fax 134. The color printer 154, which can use any printing technology such as electro-photographic, inkjet or impact, then reproduces the image. The reproduced color image, by using the Q-Tables formed in accordance with the invention maintains or preserves the visual quality of the original source image while allowing the compressed image to be transmitted in a reasonable amount of time over a limited bandwidth channel. By significantly reducing the transmission time while at the same time maintaining the visual quality of the original image, the invention achieves the goals required of a commercially successful color facsimile product.

The compression and decompression engines described herein with reference to the color fax 134 are not limited to these particular embodiments. For example, the quantization tables formed according to the invention can be used with the compression and decompression engines as taught in our commonly-assigned application entitled TEXT AND IMAGE SHARPENING OF JPEG COMPRESSED IMAGES IN THE FREQUENCY DOMAIN, Ser. No. 08/411,369, incorporated herein by reference.

The color facsimile machine 134 is but one example of an application for the JPEG compression and decompression engines of the invention. The quantization tables formed by the above described method can be used in any context that requires continuous-tone image compression. These applications are typically those that have limited bandwidth capability. An example of another such limited bandwidth application is a personal computer or work station. In these applications color images are displayed on the screen, which can be represented in a variety of different formats such as Postscript. JPEG compression can be used to compress these color images to allow for more efficient transmission of the compressed image over the limited bandwidth channel.

An advantage of the present invention is that it is compatible with any JPEG compliant decompression engine. Thus, the invention can be implemented in the compression engine without any corresponding change required in the decompression engine. Accordingly, images compressed using a compression engine having the quantization tables formed according to the invention can be received and decompressed by prior art decompression engines.

Having illustrated and described the principles of our invention in a preferred embodiment thereof, it should be readily apparent to those skilled in the art that the invention can be modified in arrangement and detail without departing from such principles. For example, although the invention has been described in reference to the JPEG compression standard, the method is applicable to MPEG, H.261 or other compression standards as well. Moreover, the entropy encoding described above is not limited to Huffman encoding, other lossless encoding methods being known in the art. We claim all modifications coming within the spirit and scope of the accompanying claims.

What is claimed is:

1. A machine for transmitting color images containing text characters, the machine comprising:

a scanner configured to render a color image into color source image data representing the color image;

a compression engine that compresses the source image data into compressed image data, the engine including:

means for converting the source image data into transformed image data using a discrete cosine transform function, the transformed image data including one or more blocks of data (Y), each block including a plurality of data elements (Y(k,l)) corresponding to a respective transform basis vector, means for storing a multi-element quantization table, each quantization table element (Q(k,l)) corresponding to a respective transform basis vector, wherein each quantization table element (Q(k,l)) includes corresponding weighting factor (w(k,l)) that represents a number of bits allocated to encoding the quantization table element (Q(k,l)) and the value of w(k,l) is determined based on the importance of the quantization table element (Q(k,l)) in preserving elements of the text characters that enhance reading efficiency of the text, and wherein the value of w(k,l) is equal to a first predetermined value for quantization elements that correspond to transform basis vectors representing at least one of the 'up-downness' and the 'right-leftness' of the text characters, a second predetermined value for quantization elements that are adjacent to only one of the quantization elements having weighting factors equal to the first predetermined value, and a third predetermined value for quantization elements that are adjacent to two or more of the quantization elements having weighting factors equal to the first predetermined value, a quantizer that converts the transformed image data into quantized image data ($Y_Q$) in accordance with the quantization table elements, and an entropy encoder that transforms the quantized image data into the compressed image data; and means for transmitting the compressed image data.

2. A machine according to claim 1 wherein the value of w(k,l) is equal to a fourth predetermined value for any quantization elements that are adjacent to those elements having the second predetermined value and wherein the value of w(k,l) is equal to a fifth predetermined value for any quantization elements not assigned the predetermined value, the second, the third, or the fourth predetermined values.

3. A machine according to claim 2 wherein the predetermined value is equal to 1, the second predetermined value is equal to ½, the third predetermined value is equal to ¾, and the fourth predetermined value is equal to ¼ and the fifth predetermined value is equal to ⅛.

4. A machine according to claim 1 wherein the means for storing a multi-element quantization table includes a memory storage device having the plurality of quantization elements stored therein.

5. A machine according to claim 1 wherein the means for transmitting the compressed image data includes:

means for packetizing the compressed image data according to a predetermined format; and means for transmitting the compressed image data over a predetermined electrical interface.

6. A machine according to claim 1 wherein the scanner includes a color scanner that converts a physical image into color source image data representing the physical image.

7. A machine according to claim 1 wherein the scanner includes a digital computer programmed to convert a computer displayable image into color source image data.

8. A machine according to claim 1 wherein each quantization table element (Q(k,l)) corresponds to a respective transform basis vector y(k,l) and is described by the following expression:

$$Q(k,l) = M / (2^{**} N_{k,l})$$

where $N_{k,l}$ represents the expected number of bits allocated for the corresponding data element (Y(k,l)) and M represents the maximal range of the data element.

9. A machine according to claim 8 wherein the value of $N_{k,l}$ is described by the following expression:

$$N_{k,l} = (\tfrac{1}{2}) \times \log_2 (w(k,l) \times V_y(k,l)/D))$$

where w(k,l) is equal to a weighting factor that allocates more bits to the data elements that preserve the visual quality of the image and fewer bits to the data elements that do not have a significant impact on the visual quality, where $V_y(k,l)$ is equal to the variance of the Y(k,l)-th data element of the image, and D is equal to a predetermined scaling factor.

10. A quantizer for use in conjunction with a compression engine quantization table for quantizing source image data into quantized image data in accordance with a predetermined compression standard using a discrete cosine transform, the quantizer comprising:

means for receiving source image data;

means for storing a plurality of quantization table elements, each table element corresponding to a respective transform basis vector and being organized as an MxM matrix;

each quantization table element (Q(k,l)) including:

a threshold term that produces a perceptually lossless quantization of the image, a bit rate term that results in the expected value of the compressed image size being equal a predetermined size, and a supra-threshold term that produces a perceptually lossy compression of the image but where the supra-threshold term is selected to preserve critical textual elements;

means for dividing a source image datum by a corresponding quantization table element to produce an integer and a fractional remainder;

means for providing the integer part as a quantized image datum; and means for outputting quantized image data.

11. A quantizer according to claim 10 wherein each supra-threshold term is selected to preserve predetermined textual elements having a predetermined physical dimension.

12. A quantizer according to claim 10 wherein each supra-threshold term is selected to preserve horizontal image elements having a predetermined width.

13. A quantizer according to claim 12 wherein each supra-threshold term is selected to preserve horizontal image elements having a predetermined width by more heavily weighting quantization elements residing in a first column of the matrix.

14. A quantizer according to claim 10 wherein each supra-threshold term is selected to preserve vertical image elements having a predetermined height.

15. A quantizer according to claim 14 wherein each supra-threshold term is selected to preserve vertical image elements having a predetermined height by more heavily weighting quantization elements residing in a first row of the matrix.

16. A method of quantizing source image data using a discrete cosine transform function, the method comprising:

receiving source image data representing a source image;

selecting a threshold term that results in perceptually lossless quantization of the image;

selecting a bit rate term so that the expected value of the compressed image size equals a predetermined size;

selecting a supra-threshold term that results in perceptually lossy compression but where the supra-threshold term is selected to preserve critical textual elements;

combining the threshold term, the bit rate term, and the supra-threshold term to form a corresponding quantization table element;

dividing each source image datum by a respective quantization table element to form a quantized image datum.

17. A method of quantizing source image data according to claim 16 wherein the step of selecting a supra-threshold term includes:

selecting a set of target images, each target image having one or more image elements;

identifying image elements that enhance reading efficiency of text; and selecting a supra-threshold term that gives a larger weight to the table elements that correspond to the identified image elements and a smaller weight to the table elements that do not correspond to the identified image elements.

18. A method of quantizing source image data according to claim 17 wherein the step of selecting a supra-threshold term includes giving a larger weight to the table elements corresponding to the "up-downness" of the image.

19. A method of quantizing source image data according to claim 17 wherein the step of selecting a supra-threshold term includes giving a larger weight to table elements along a first row of the quantization table.

20. A method of quantizing source image data according to claim 17 wherein the step of selecting a supra-threshold term includes giving a larger weight to the table elements corresponding to the "left-rightness" of the image.

21. A method of quantizing source image data according to claim 17 wherein the step of selecting a supra-threshold term includes giving a larger weight to table elements along a first column of the quantization table.

22. A method of quantizing source image data according to claim 17 wherein the step of selecting a supra-threshold term includes giving a smaller weight to the table elements corresponding to the "criss-crossedness" of the image.

23. A method of quantizing source image data according to claim 17 wherein the step of identifying image elements that enhance reading efficiency of text includes identifying parts of text.

24. A method of quantizing source image data according to claim 23 wherein the step of identifying parts of text includes identifying ears, bars, stems, stresses, and serifs.

* * * * *